April 24, 1951  G. F. DRAKE  2,549,786
HYDRAULIC FORCE AMPLIFIER
Filed Nov. 12, 1948
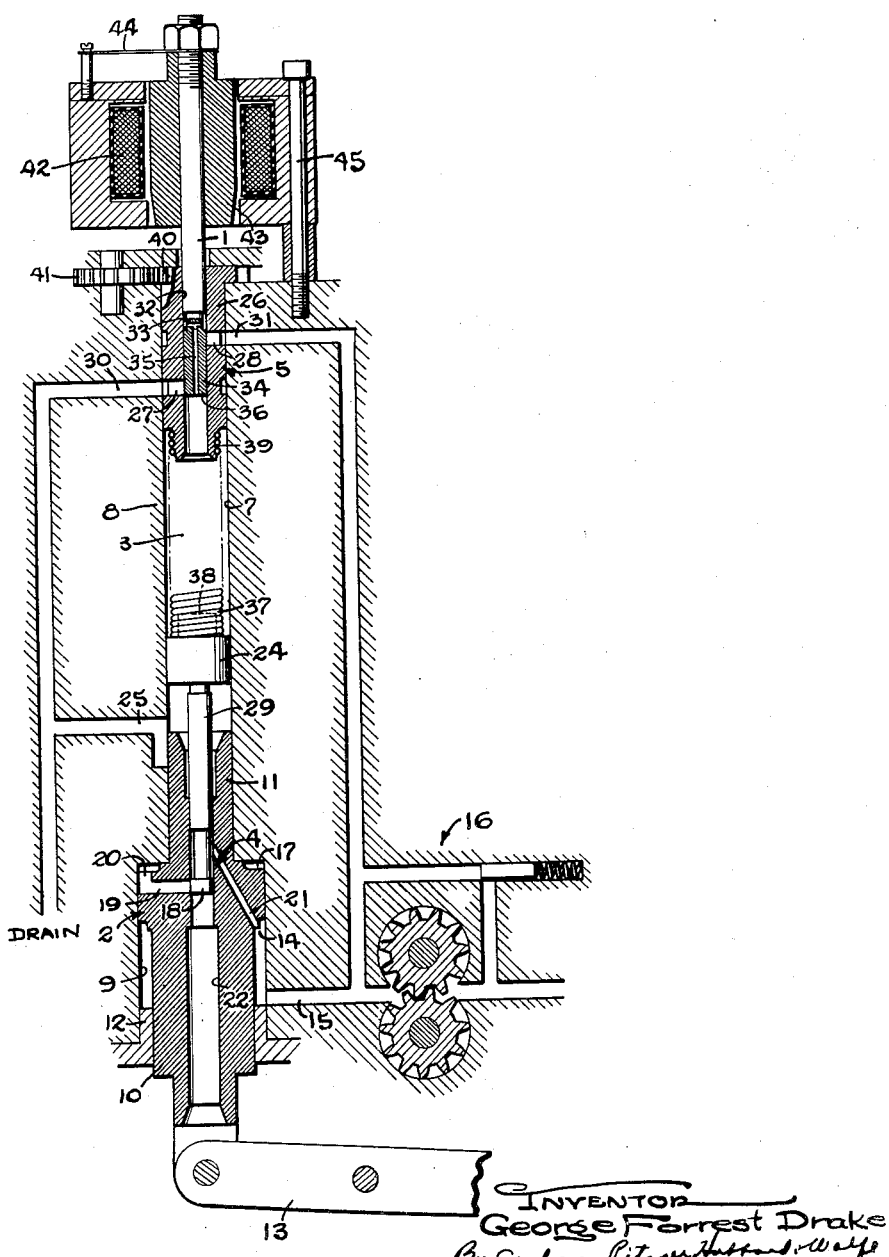
INVENTOR
George Forrest Drake
By Carlson, Pitzner, Hubbard, Wolfe
ATTORNEY Patented Apr. 24, 1951

2,549,786

UNITED STATES PATENT OFFICE 2,549,786

HYDRAULIC FORCE AMPLIFIER

George Forrest Drake, Rockford, Ill., assignor to Woodward Governor Company, Rockford, Ill., a corporation of Illinois Application November 12, 1948, Serial No. 59,692

6 Claims. (Cl. 121—41)

This invention relates to an amplifier operating hydraulically to magnify the changes in a control force and convert the same into a proportional displacement either mechanical or hydraulic.

The general object is to provide an amplifier of the above character which is extremely sensitive to small changes in the control force, which proportions the ultimate displacement accurately in accordance with such changes, and which is not affected in its sensitivity by changes in the load opposing the displacement.

The invention also resides in the simple construction and compact arrangement of the parts and in the manner of relieving static friction acting thereon.

Other objects and advantages of the invention will become apparent from the following detailed description taken in connection with the accompanying drawing which is a longitudinal sectional view of a hydraulic amplifier embodying the novel features of the invention.

The invention is susceptible of various modifications and alternative constructions and of control by various kinds of signals. It is to be understood, therefore, that I do not intend to limit the invention by such disclosure but aim to cover all modifications and alternative constructions falling within the spirit and scope of the invention as expressed in the appended claims.

In the form shown for purposes of illustration, the amplifier is adapted to respond to variations in a control force on an axially movable rod 1 and operates to produce a displacement of a servo piston 2 corresponding in extent to the change in the control force. Generally stated, the control force actuates a pressure balanced pilot valve 5 to correspondingly vary the fluid pressure in a chamber 3 which pressure is exerted on the actuator for a secondary valve 4. The latter operates with a follow-up action to vary the energization of the fluid servo and cause the piston 2 to move in a direction through a distance precisely proportional to the change in magnitude of the control force.

To simplify the construction, provide a compact arrangement and at the same time minimize the effect of friction, the parts above referred to are alined axially and disposed in an elongated bore 7 in a body 8, the bore being enlarged at its lower end to form the cylinder 9 of the movable servo member or piston 2. Herein, the piston is hollow and formed with oppositely projecting tubular rods 10 and 11, one being guided in the lower part of the bore 7. The other is slidable in a flanged bushing 12 and adapted for connection of its outer end with a device 13 to be actuated.

The piston 2 is of the differential type having a lower area 14 subjected to a substantially constant pressure by connection of the lower end of the cylinder 9 with a passage 15 leading to a suitable fluid pressure source indicated at 16. The upper area 17 of the piston is somewhat larger and the pressure on the latter is controlled by operation of the valve 4. Preferably the latter is of the plunger type having one part movable with the servo member 2 in order to obtain the desired follow-up action. To this end, the valve comprises a land 18 on the lower end of a stem 29 of the same size at its upper end and guided in the bore of the piston rod 11. The land cooperates with a port 19 of equal width opening inwardly from a passage 20 which extends outwardly through the piston and communicates with the upper end of the cylinder 9.

When the land 18 is in neutral position as shown, the port 19 will be closed and fluid will be trapped in the upper end of the cylinder, thereby maintaining the position of piston 2 against the normal pressure on the piston area 14. If the valve land is lowered to expose a part of the port 19, fluid from the source 16 will be admitted to the upper end of the cylinder through the valve and a passage 21 extending diagonally through the piston 2 and into the valve chamber. As a result, the pressure on the larger area 17 will overcome the pressure on the area 14 and force the piston downwardly until the port 19 becomes closed by the land. Raising of the land above the neutral position will release fluid from the upper cylinder end to the drain passage 22 through the rod 10 thereby allowing the piston to move upwardly until the port 19 again becomes covered by the land.

It will be observed that the servo piston will always be disposed so as to follow precisely the movements of the valve plunger 29, and this irrespective of variations in the load on the piston 2. This is due to the follow-up action above described as a result of which the pressure on the larger piston area 17 continues to increase or decrease until the piston has moved far enough to reclose the valve 4.

The land 18 or control element of the valve 4 is moved back and forth in proportion to fluid pressure changes within the chamber 3. For this purpose, the upper end of the valve plunger 29 is rigid with a piston 24 slidable in the bore 7 which, at a point between the piston and the rod 11 of the servo piston, is connected to a passage 25 leading to the drain.

The upper or pilot valve 5 is formed by a sleeve 26 fitting into the upper end of the bore 7 and having inwardly opening axially spaced ports 27 and 28 communicating with peripheral grooves respectively connected by passages 30 and 31 to the drain and the pressure source 16. The ports open into the bore 32 of the sleeve into which the control rod 1 projects and is adapted to slide axially. Intermediate its end the rod 1 is cut away to form a pressure chamber 33 above a land 34 which is just long enough to cover the ports 27 and 28 when the control rod is in the neutral position shown.

A passage 35 extending axially through the land establishes continuous communication between the valve chamber 33 and the chamber 3 so that the pressure in the latter chamber acts downwardly in the piston 24 and also upwardly on the smaller area 36 at the lower end of the valve rod 1. To proportion the pressure in the chamber in accordance with changes in the control force and at the same time cause the piston 24 to be displaced correspondingly, the piston is urged upwardly by a spring 37. While this spring may be of the compression type, it is shown herein as a coiled contractile spring stretched between the piston and the valve sleeve 26 with opposite ends screwed onto the reduced ends 38 and 39 of the piston and the sleeve. The spring is thus adapted to act as a mechanical coupling for transmitting rotary motion between the piston and the sleeve.

The various pressure areas, the supply pressure and the scale of the spring will of course be correlated with each other and with the magnitude of the control force so that the pressure in the chamber 3 may be balanced against the control force throughout the range of variation of the latter in service.

To attain optimum sensitivity of the amplifier in response to changes in the control force applied to the rod 1, provision is made for eliminating static friction on the control rod and all of the coacting parts of the valves 4 and 5. Herein this is accomplished by continuously rotating sleeve 26 and the valve plunger 29 which as described above are coupled together by the spring 37. For this purpose, the end of the sleeve which projects outwardly from the body 8 carries a gear 40 meshed with a gear 41 which is journaled on the body 8 and rotated continuously from a suitable power source (not shown). Thus, the sleeve turns relative to the control rod and the valve land 34, the piston 24 rotates within the bore 7, and the valve stem 29 and the land 18 turn within the piston 2 and the rod 11. The valve parts are thus adapted to move axially without the necessity of overcoming static friction and therefore respond to minute changes in the control forces.

The control force may be applied to the rod 1 in various ways usually determined by whether the force or signal is derived by mechanical, electrical, hydraulic, pneumatic, or chemical action. For example, if the signal results in changes in an electric voltage or current, it may, if desired, be applied to the rod 1 through the intermediary of an electromagnet. The magnet shown is of the solenoid type having a ring-like coil 42 concentric with the rod 1 and rigidly clamped as by a bolt 45 to the body 8. The plunger or armature 43 of the solenoid is threaded or otherwise secured to the rod 1 and preferably supported yieldably as by a leaf spring 44 which may be mounted on the solenoid core. With this arrangement, the armature and therefore the control rod 1 will be raised and lowered with changes in the energization of the solenoid coil.

*Operation*

At equilibrium, the ports are positioned, as shown in the drawing, the control force acting on the rod 1 being balanced by the pressure within the chamber 3 acting upwardly on the lower end 36 of the valve plunger, which pressure balances the stress of the spring 37 so that the piston 24 of the relay valve, and therefore the servo piston 2, occupy positions corresponding to the prevailing value of the control force.

Now if the control force changes so as to increase the downward pressure on the valve stem 1, the latter is moved downwardly so that the land 34 exposes the port 28. Pressure fluid is thus allowed to flow into the chamber 33 and downwardly through the passage 35 into the chamber 3. The pressure in the latter is thus increased in opposition to the force of the spring and such increase continues until the resulting pressure acting upwardly on the area 36 overcomes the change in the control force and moves the valve plunger back to neutral position. At this time, the fluid pressure on the valve stem just balances the changed control force.

As a result of the valve action described above, the piston 24 is displaced downwardly by an amount proportional to the change in the control force. The accompanying lowering of the valve land 18 uncovers part of the port 19 permitting pressure fluid to flow through the passages 21 and 20 to the larger area 17 of the differential piston 2. The latter is thus forced downwardly relative to the valve plunger 29 until the port 19 again becomes covered by the valve land 18. Since the port 19 is on the servo piston 2, the extent of the follow-up motion and therefore the displacement of the servo piston will precisely equal the motion of the valve piston 24. The servo displacement therefore corresponds exactly with the change in the magnitude of the control force.

The reverse action occurs when the control force is decreased. This allows the valve land 34 to rise under the prevailing pressure in the chamber 3 thereby uncovering the port 27 to permit fluid to escape from the chamber 3. The pressure in the latter is thus reduced until the force on the plunger end 36 again equals the changed control force whereupon the port 27 is reclosed. The pressure reduction in the chamber 3 allows the spring to raise the piston 24 and the valve land 18 thereby permitting fluid to escape from the upper end of the servo cylinder 9. This is accompanied by corresponding raising of the piston 2.

It will be observed that the measured displacement of the servo piston to rebalance the system takes place regardless of changes in the load within the servo. Thus, variations in the load have no effect on the accuracy of positioning the servo nor on the sensitivity of the device by which the control force is applied to the control rod 1. Moreover, displacement of the servo does not require and is not accompanied by any appreciable movement of the control rod. The latter may thus be actuated conveniently by a solenoid or other instrumentality having a relatively short range of operating movement.

I claim as my invention:

1. Mechanism for amplifying a control force comprising a body having an elongated bore, a ported valve sleeve rotatable in one end of said bore, a piston axially slidable in said bore beyond the inner end of said sleeve, a resiliently rotary drive connection between said piston and said inner sleeve end, said connection being yieldably extensible and contractible axially in response to fluid pressure changes in the chamber within said bore between said piston and said sleeve, a valve plunger reciprocable in said sleeve and adapted at its outer end to receive said control force, the inner end of said plunger closing said sleeve bore, ports and lands on said plunger and sleeve cooperating to form a valve for permitting the flow of pressure fluid to and from said chamber in response to axial displacement of said plunger in opposite directions away from a neutral position relative to said sleeve, a tubular piston slidable in the other end of said bore and having an axial bore, a cylinder in which the servo piston slides, a valve stem projecting from said first piston into said servo piston bore, a land and port formed on said second bore and said stem and cooperating to form a second valve operable by displacement of said first piston to admit pressure fluid to or from said servo cylinder to cause displacement of the servo piston in a direction to follow up the displacement of said first piston, and means for rotating said sleeve to eliminate static friction between the coacting surfaces of valves and said first piston and bore.

2. Mechanism of the character described comprising a body providing an elongated bore, a ported valve sleeve rotatable in one end of said bore, a piston axially slidable in said bore beyond the inner end of said sleeve, a resiliently rotary drive connection between said piston and said inner sleeve end, said connection being extensible and contractible axially in response to fluid pressure changes in the chamber defined by said bore between said piston and said sleeve, a plunger reciprocable in said sleeve movable in response to pressure changes in said chamber and also to changes in a control force, ports and lands on said plunger and sleeve cooperating to form a valve controlling the flow of pressure fluid to and from said chamber in response to axial displacement of said plunger in opposite directions away from a neutral position relative to said sleeve, a fluid servo, a second valve including a land movable with said piston operable by displacement of the piston to admit pressure fluid to or from said servo to produce a displacement corresponding to the piston displacement, and means for rotating said sleeve, said piston and said second valve land in unison.

3. Mechanism of the character described comprising means providing a fluid filled chamber, a cylinder communicating with said chamber and having a piston slidable therein, a sleeve projecting into said chamber in axial alinement with said cylinder, a spring within said chamber connecting said sleeve and piston for rotation in unison and resiliently urging the piston inwardly to compress the fluid in said chamber, a valve for admitting pressure fluid to or releasing the same from said chamber and having a member movable axially in said sleeve in response to pressure changes in said chamber and also in response to changes in an opposing control force, a fluid servo, and a second valve actuated by said first piston to admit pressure fluid to or release the same from said servo to displace the piston thereof in accordance with the displacement of the first piston, said second valve having a part rotatable with said first piston.

4. In a mechanism of the character described, the combination of means providing a cylindrical bore, a piston slidable in said bore and closing one end thereof, means constantly acting on said piston resiliently to urge the piston unidirectionally toward the opposite end of said bore, a sleeve rotatable in the latter end portion of the bore, a plunger slidable axially in said sleeve and closing said bore to form a chamber between said piston and plunger and filled with fluid constantly maintained under pressure by said resilient means, said plunger being arranged to receive said control force and be shifted axially thereby, a valve responsive to motion of said plunger produced by said control force to admit pressure fluid to or permit the escape of the same from said chamber, the parts of said valve being restored to a neutral position in response to the change in pressure in the chamber resulting from each control force change, and means for continuously rotating said sleeve and said piston relative to said bore.

5. Mechanism of the character described comprising, an axially movable piston, a plunger axially alined therewith and slidable axially in response to changes in a control force, means providing cylinders for said plunger and piston and defining a fluid filled chamber therebetween, said piston being urged yieldably into said chamber to compress the fluid therein, a valve responsive to motion of said plunger produced by said control force to admit pressure fluid to or permit the escape of fluid from said chamber, the parts of said valve being restored to neutral position in response to the resulting change in the chamber pressure, a fluid servo, a valve responsive to the movements of said piston to control the flow of pressure fluid to and from said servo to cause displacement of the movable element thereof in accordance with the displacement of said piston, said second valve including cooperating parts one of which is rigid with said piston, and means for effecting continuous relative rotation between said cylinders and both said piston and said plunger and also between the parts of said second valve.

6. Mechanism of the character described comprising, a rotary sleeve, a piston axially spaced from one end of said sleeve and coupled to the sleeve for rotation in unison therewith, means enclosing said sleeve and said piston and defining a fluid filled chamber therebetween, a plunger axially slidable in said sleeve in response to changes in a control force, a valve responsive to the motion of said plunger and operable to admit pressure fluid to or permit the escape of fluid from said chamber, the parts of said valve being restored to neutral position in response to the resulting change in the chamber pressure, a fluid servo, a valve controlling the flow of pressure fluid to and from said servo including cooperating valve elements one carried by said piston for rotation therewith, and means for rotating said sleeve relative to said plunger and simultaneously rotating said piston and the valve element thereon.

GEORGE FORREST DRAKE.

REFERENCES CITED

The following references are of record in the file of this patent:

UNITED STATES PATENTS

| Number | Name | Date |
|---|---|---|
| 1,231,257 | Herr | June 26, 1917 |
| 1,585,529 | Boving | May 18, 1926 |
| 1,718,673 | Wettstein | June 25, 1929 |
| 2,243,781 | Thornhill | May 27, 1941 |
| 2,324,516 | Kalin | July 20, 1943 |
| 2,413,287 | Bush | Dec. 31, 1946 |